United States Patent [19]

Hope

[11] Patent Number: 5,378,558
[45] Date of Patent: * Jan. 3, 1995

[54] COMPOSITE ELECTROLYTES FOR ELECTROCHEMICAL DEVICES

[76] Inventor: Stephen F. Hope, 2231 Papermill Rd., Huntingdon Valley, Pa. 19006

[ * ] Notice: The portion of the term of this patent subsequent to Apr. 7, 2009 has been disclaimed.

[21] Appl. No.: 1,145

[22] Filed: Jan. 7, 1993

Related U.S. Application Data

[63] Continuation-in-part of Ser. No. 775,100, Oct. 11, 1991, abandoned, which is a continuation-in-part of Ser. No. 568,170, Aug. 16, 1990, Pat. No. 5,102,752.

[51] Int. Cl.$^6$ ............................................. H02M 10/40
[52] U.S. Cl. .................................... 429/192; 252/62.2
[58] Field of Search ........................ 429/192; 252/62.2

[56] References Cited

U.S. PATENT DOCUMENTS

| | | | |
|---|---|---|---|
| 4,654,279 | 3/1987 | Bauer et al. | 429/199 X |
| 4,792,504 | 12/1988 | Schwab et al. | 429/192 |
| 4,822,701 | 4/1989 | Ballard et al. | 429/192 |
| 4,830,939 | 5/1989 | Lee et al. | 429/194 X |
| 4,990,413 | 2/1991 | Lee et al. | 429/192 |
| 5,102,752 | 4/1992 | Hope et al. | 252/62.2 X |

Primary Examiner—Stephen Kalafut
Attorney, Agent, or Firm—Z. T. Wobensmith, III

[57] ABSTRACT

A solid state polymer electrolyte composite which is formed by impregnating a fibrous open mesh, electrically non-conductive net, with a liquid, ion-conductive polymer, and curing the polymer to form a solid state or semi-solid state electrolyte composite.

4 Claims, No Drawings

COMPOSITE ELECTROLYTES FOR ELECTROCHEMICAL DEVICES

This application is a continuation in part of my prior co-pending application Ser. No. 07/775,100, now abandoned filed Oct. 11, 1991 entitled "Solid State Composite Electrolyte For Batteries and The Like" which was a continuation in part of application Ser. No. 07/568,170, filed Aug. 16, 1990, now Pat. No. 5,102,752.

BACKGROUND OF THE INVENTION

Field of the Invention

This invention relates to solid and semi-solid state electrolyte composites which contain an electrically insulating fibrous structure, which is saturated with an ion conductive solid state matrix, which has been solidified by an alkali metal triflate salt, or an alkaline earth metal trillate salt and a radiation curable polymer.

DESCRIPTION OF THE PRIOR ART

In the prior art various polymers have been used as components of the electrolytes of solid state alkali metal, and alkaline earth metal batteries, and various other kinds of electrochemical devices.

Among the problems associated with these polymers is that they have inherent relatively low ionic conductivity, and also may react with the alkali metals used, such as lithium, or other metallic anodes, to form a non-conductive boundary layer, which prevents the free flow of ions and hinders rechaegeability.

The prior art polymer containing electrolytes also have exhibited poor adherence to the electrodes, are not flexible and do not possess sufficient mechanical strength to prevent shorting under pressure, or punching through of dendrites and consequent shorting of the device.

The U.S. Patent to Hope et al, No. 5,102,752 describes a solid state electrolyte composite for batteries only, which is an electrically insulating fibrous structure saturated by and embedded in an ionically conductive solid state matrix.

While this composite may be adequate for many applications, the materials described are not the most inert and may not withstand the number of cycles required during the expected life of secondary batteries and other electrochemical devices.

Additionally the combination of a plurality of the ion conductive liquids contained in the matrix which improves the conductivity and cycleability of the devices is not disclosed.

The Hope patent No. 5,102,752 only applies to the construction of batteries, and not to capacitors and other electrochemical devices, and additionally does not claim a semi-solid state electrolyte composite.

The composite electrolytes of the invention do not suffer from prior art problems and provide many positive advantages.

SUMMARY OF THE INVENTION

It has now been found that, solid or semi-solid state electrolytes which are highly ion conductive, shorting-proof, dendrite-proof, flexible yet mechanically strong, and inert to component materials, can be made by rising a composite construction, where an electrically insulating, fibrous and porous material, preferably a net of inert material, is impregnated with a liquid ion conductive material, which is solidified by using an alkali metal trillate salt, such as lithium trillate salt with polyethylene oxide (PEO) alone, or by an alkaline earth metal trillate salt with a radiation curable polymer to form a solid state ionically conductive matrix.

The principal object of the invention is to provide solid or semi-solid state composite electrolytes for batteries, capacitors and other electrochemical devices.

A further object of the invention is to provide electrolytes of the character aforesaid that are inert to the component materials used in various electrochemical devices.

A further object of the invention is to provide electrolytes of the character aforesaid that have excellent adherence and low shrinkage properties.

A further object of the invention is to provide electrolytes of the character aforesaid, that are flexible, tough and resistant to dendrite formation, but are easy to handle and produce.

A further object of the invention is to provide electrolytes of the character aforesaid that are mechanically strong and resist shorting under pressure.

A further object of the invention is to provide electrolytes of the character aforesaid that are highly stable at elevated temperatures, and allow rapid processing.

Other objects and advantageous features of the invention will be apparent from the description and claims. It should, of course, be understood that the description herein is merely illustrative and that various modifications and changes can be made in the structure disclosed without departing from the spirit of the invention.

DESCRIPTION OF THE PREFERRED EMBODIMENTS

Electro-chemical devices such as alkali or alkaline earth metal batteries, and for example lithium batteries, consist of at least an anode layer, a polymer electrolyte layer, and a cathode layer. Such devices can be of virtually any desired size and configuration, and usually include additional layers such as current conducting backing layers, insulating layers and electrode connection layers.

The polymer dielectric or electrolyte layer must be compatible with the component materials used to fabricate the devices while possessing suitable ionic conductivity.

In the device described herein, which is a battery, a base (not shown) is provided which can be a web of material, such as nickel foil or carbon fibers coated with a cathode material as described in Pat. No. 4,794,059.

The cathode may then have an additional layer (not shown) of solid state polymeric electrolyte composite applied thereto, which composite may include an electrically non-conductive fibrous layer or net which is inert to the components, and which has been impregnated with polymeric material, such as polyethylene oxide and propylene carbonate compounded with lithium trifluoromethane sulfonate, and which is also referred to as lithium triflate.

An additional layer (not shown) of anode material is applied on top of the electrolyte layer, which can be a base layer of carbon fibers coated with alkaline metal as described in Pat. No. 4,794,059, or an alkali metal foil, or an alkaline earth metal foil rolled onto a net of carbon fibers to form an anode layer (not shown).

The resultant battery can be provided with other layers. as desired.

A solid state polymeric electrolyte composition which is suitable, for example, for lithium batteries, capacitors, electrochromic devices, sensors, fuel cells, memory devices, and devices for brine electrolysis by an ion exchange method, contains propylene carbonate (PC) in the range of 20% to 90% by weight, 1,2 - dimethoxyethane (DME) in the range of 4% to 69% by weight, an ion conductive salt such as lithium triflate in the range of 1% to 30% by weight, and polyethylene oxide (PEO) in the range of 0.2% to 60% by weight, and an optional well known radiation curable polymer in the range of 2% to 60% by weight. The PC can be replaced by any suitable ester, or ether or pyrrolidinone of the same percentage weight range.

The PC can also be replaced by a combination of ion conductive esters, ethers, and pyrrolidinones which provides improved conductivity and cycleability.

Suitable esters would be propylene carbonate, and ethylene carbonate, and butylene carbonate.

Suitable ethers would be 1,2-dimethoxypropane; 1,2-dimethoxyethane; tetrahydrofuran; and 2 -methyl tetrahydrofuran; and polyethylene glycol dimethyl ether.

A suitable pyrrolidinone would be 1,5 dimethyl -2, pyrrolidinone; and n-methyl pyrrolidinone.

These and other suitable esters, ethers and pyrrolidinones can be substituted in the same total percentage weight range as the PC or DME they replace.

The described composition is heated to 70° C. and soaked into an electrically non-conductive fibrous net, and then solidified by cooling to 27° C. or less, and by the presence of lithium triflate as described in prior U.S. patent application Ser. No. 07/632,971 filed Dec. 24, 1990. If a radiation curable polymer is also used, the impregnated composite is irradiated by UV light, or electron beam radiation before cooling as described in U.S. Pat. No. 5,006,531.

It should be rooted that, for other electrochemical devices, the lithium trillate salt should be replaced by a corresponding triflate salt to match the elected alkali or alkaline earth metal.

Preferred embodiments of the invention are illustrated in the following examples:

EXAMPLE #1

A sample of polymeric electrolyte composite was formed by compounding a lithium salt and a polymeric material which consisted of 42.75% (percent) by weight of propylene carbonate (PC), 42.75% (percent)by weight of 1,2 dimethoxyethane (DME), 11% (percent.) by weight of lithium triflate and 3.5% (percent) by weight of polyethylene oxide (PEO).

The mixture was heated to 70° C. and became liquid, a fibrous nonwoven net of polyterafluoroethylene fabric was impregnated with the hot liquid. The hot impregnated fabric was applied to an electrode layer, and by cooling it to 27° C. or less, solidified clue to the presence of the lithium-triflate and formed a solid or semi-solid, ion conductive layer of the desired thickness, strength and adherence.

EXAMPLE #2

Another example of polymeric electrolyte composite was formed by compounding a lithium salt and a polymeric material, which consisted of 36.6% (percent) by weight of PC, 36.6% (percent) by weight of DME, 10% (percent) by weight of lithium trillate, 1.8% (percent) by weight of PEO and 15% (percent) by weight of a radiation curable polymer such as Envibar UV-1244.

The mixture was heated to 70° C. and became liquid, a net of fibrous non-woven ceramic fabric was impregnated with the hot mixture. The hot impregnated fabric was applied to an electrode layer and exposed to ultraviolet radiation while still hot, which caused it to crosslink. The composite was then cooled to 27° C. or less and formed a solid or semi-solid ion conductive layer of desired thickness, strength and adherence.

The net material can also be of other materials which do not react with the other components of the devices. Suitable nets include a film of porous polytetrafluoroethylene with pores larger than 0.1um, or of liquid crystal polymer fibers, polybenxzobisoxazole (PBO) fibers, a woven or non-woven fabric or paper, with or without a binder, or fibers of any suitable inert and electrically insulating polymer.

The described materials, and preferably non-woven polyterafluoroethylene fabrics without a binder, are especially inert to battery chemistry and thus improve the battery cycleability. The described polytetrafluoroethylene, is also known tinder the trade mark "Teflon".

It is thus apparent that compositions have been described with which the objects of the invention are achieved.

I claim:

1. A solid or semi-solid state electrolyte composite for electrochemical devices wherein the electrolyte composite consists of
an inert, electrically insulating net of porous fiber material, which has been impregnated with and is embedded in an ionically conductive solid or semi-solid state matrix,
said net is of polybenzobisoxazole fibers, and
said solid or semi-solid state matrix is formed from an ion conductive liquid which has been complexed with an alkali metal, or alkaline earth metal trifluoromethane sulfonate salt and polyethylene oxide.

2. A solid or semi-solid state electrolyte composite for electrochemical devices wherein the electrolyte composite consists of
an inert, electrically insulating net of porous fiber material, which has been impregnated with and is embedded in an ionically conductive solid or semi-solid state matrix,
said net is a liquid crystal polymer, and
said solid or semi-solid state matrix is formed from an ion conductive liquid which has been complexed with an alkali metal, or alkaline earth metal trifluoromethane sulfonate salt and polyethylene oxide.

3. A solid or semi-solid state electrolyte composite for electrochemical devices wherein the electrolyte composite consists of
an inert, electrically insulating net of porous fiber material, which has been impregnated with and is embedded in an ionically conductive solid or semi-solid state matrix,
said net is composed of ceramic fibers, and
said solid or semi-solid state matrix is formed from an ion conductive liquid which has been complexed with an alkali metal, or alkaline earth metal trifluoromethane sulfonate salt and polyethylene oxide.

4. A solid or semi-solid state electrolyte composite for electrochemical devices wherein the electrolyte composite consists of
an inert, electrically insulating net of porous fiber material, which has been impregnated with and is embedded in an ionically conductive solid or semi-solid state matrix,
said net is of polytetrafluorethylene fibers, and
said solid or semi-solid state matrix is formed from an ion conductive liquid which has been complexed with an alkali metal, or alkaline earth metal trifluoromethane sulfonate salt and polyethylene oxide.

* * * * *

UNITED STATES PATENT AND TRADEMARK OFFICE
CERTIFICATE OF CORRECTION

PATENT NO. : 5,378,558
DATED : January 3, 1995
INVENTOR(S) : STEPHEN F. HOPE

It is certified that error appears in the above-identified patent and that said Letters Patent is hereby corrected as shown below:

COLUMN 1:

Line 20,"trillate" should be --triflate--,
    Line 64 "rising" should be --using--,

COLUMN 2:

Line 1 "trillate" should be --triflate--,(both instances)
    Line 3 "trillate" should be --triflate--,

COLUMN 3:

Line 36 "trillate" should be --triflate--,
    Line 54 "clue" should be --due--,
    Line 64 "trillate" should be --triflate--,

COLUMN 4:

Line 19 "tinder" should be --under--.

Signed and Sealed this

Seventh Day of March, 1995

Attest:

BRUCE LEHMAN

*Attesting Officer*  *Commissioner of Patents and Trademarks*